July 7, 1931.     G. ROSSETTI     1,813,640

NUT LOCK

Filed May 29, 1929

Inventor:
George Rossetti
By Milo B. Stevens
Attys.

Patented July 7, 1931

1,813,640

UNITED STATES PATENT OFFICE

GEORGE ROSSETTI, OF CHICAGO, ILLINOIS

NUT LOCK

Application filed May 28, 1929. Serial No. 367,100.

My invention relates to nut locks, and is designed more particularly as an improvement over the invention covered in my allowed patent application Serial No. 235,892, the main object of the present improvement being to provide a locking element which is built for strength or heavy duty.

A further object of the improvement is to build the locking element separate from the spring which urges the locking element into engagement whereby to eliminate the instability of a spring from the locking element.

A still further object of the invention is to build the locking element with a projection for the handy control thereof.

Another object of the improvement is to provide a retaining element for the closure plate of the device, whereby to secure the said closure plate against dislodgment and provide a compact closure for the nut.

A significant object of the invention is to design the closure plate with means for the application of a tool designed to release the lock.

A final but nevertheless important object of the invention is to construct the improved assembly with few parts of a rugged nature for efficiency and endurance.

With the above objects in view and any others that may suggest themselves from the specification and claims to follow, a better understanding of the invention may be had by reference to the accompanying drawings, in which—

Figure 2:
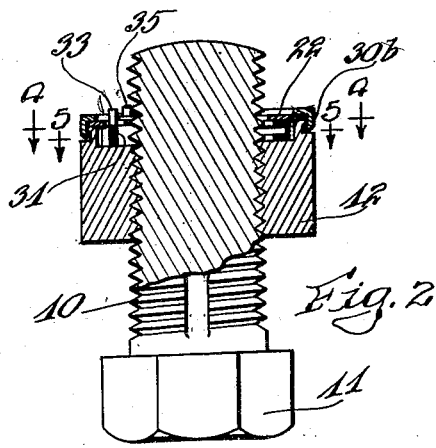
Fig. 2 is a view similar to Figure 1, but including the separate closure plate, for use on larger work.
Figure 3:
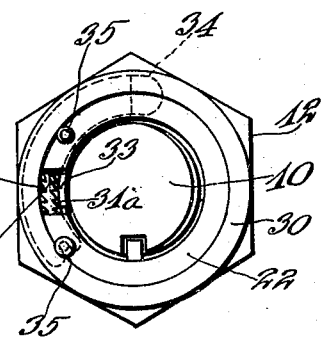
Fig. 3 is a plan view of the structure in Figure 2.
Figure 4:
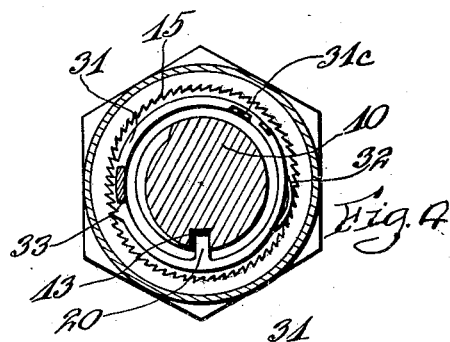
Figure 5:
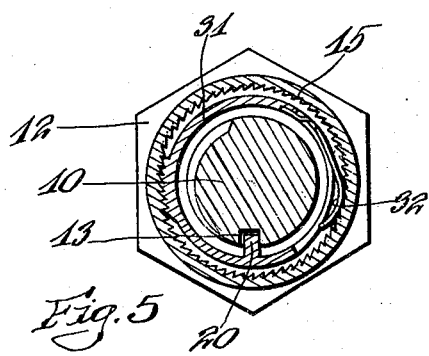
Figure 6:
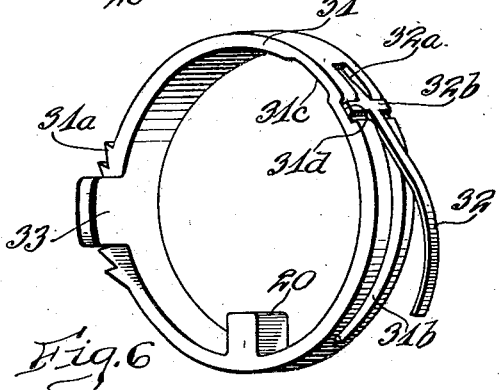

Figs. 4 and 5 are, respectively, sections on the lines 4—4 and 5—5 of Figure 2; and Fig. 6 is a perspective view of the locking element and the spring therefor.

Figure 1:
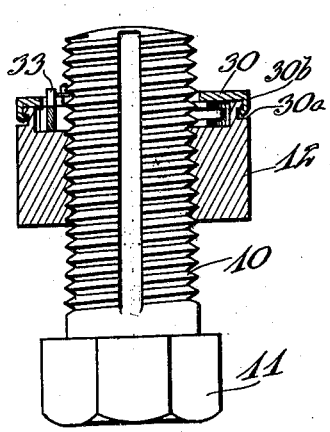
Figure 1 is an elevation, partly in section, of the improved structure minus a separate closure plate, and intended for nuts of small gauge.

In carrying out the novel embodiment, I make use as in the allowed application of the bolt 10, having the head 11 and the longitudinal slot 13. The nut 12 is of the general design as heretofore, and is adapted either to receive a plain top retainer 30, as shown in Figure 1, or include within the retainer the closure plate or ring 22. Figures 1 and 2 show that the nut is made with an annular groove 30a to receive the rim 30b of the retainer by clinching, so that the retainer holds within the nut the parts relating to the lock and also the closure ring 22 if desired.

As to the choice of the closure ring 22, nuts of small gauge can dispense with the same, as per Figure 1, but where the work is heavier, it is preferable to provide the fairly large sized ring and only use a narrow ring circumferentially for the purpose of the retainer.

As in the previous case, the nut is interiorly toothed 15 with a ratchet profile, but instead of the spring locking element, I employ a rigid one, assisted by a spring. This assembly is illustrated more clearly in Figure 6, and comprises a ring 31 of heavy gauge and extended inwardly with the spur 20. A portion of the ring periphery is built up with a series of ratchet teeth 31a which are adapted to mesh with the internal ratchet tooth formation of the nut when the ring 31 is moved in the corresponding direction. This movement is accomplished by a spring 32 which passes through a longitudinal slot 31b of the ring to lodge its forward end 32a within an internal pocket 31c of the ring. The latter also has an external cavity 31d to seat a cross bar 32b made from the spring whereby to anchor the latter against deviation. The rear or tail part of the spring by impinging upon the interior wall of the nut forces the ring 31 to make the toothed engagement previously mentioned. The ring 31 is also formed with an upstanding lug 33 which projects through a slot 22a made in the closure ring 22. The lug 33 thus becomes accessible for the application of an arcuate tool 34 in connection with upstanding pins 35 of the closure ring for the exertion of inward pressure upon the lug to unmesh the ring from the nut. The construction and operation of the tool 34 are treated at length in a companion patent application. Since the nut is positively held against rotation by the seating of its lug 20 in the slot 13 of the bolt 10, it will be seen that the unmeshing of the ring from the nut will leave the latter free to be turned in an unscrewing direction at such a time as it is desired for the nut to be unlocked and removed. Otherwise, as in the previous case, the locking device only permits the nut to be screwed down and resists return action thereof.

It will be seen that the improvement is mainly one of strength. Thus, instead of placing the load of resistance to the unscrewing of the nut upon a small part carried by a spring, I now employ a broad toothed front for the ring 31, which is backed not only by the rigidity and mass of the ring itself but finds a strong backing in the integral lug 20 of the ring which lodges in the side of the bolt. Therefore, the spring 32 is merely used to hold the ring in mesh with the nut, but the ring is employed to resist unscrewing tendencies suffered by the nut, as the intimate relation of the ring with the nut and the bolt positively guards against the tendencies referred to. The object of the elongated slot 31b is to provide a place for the portion 32 of the spring when the ring is backed in the unmeshing direction, so that the spring will then become flush with the periphery of the ring and will not resist the unscrewing of the nut. It may be said that the improved structure involves plain and durable parts and will, therefore, not occasion an unusual expense in connection with the article.

I claim:

1. The combination with a longitudinally grooved bolt shank; of a nut lock comprising a nut with an interrupted annular surface, a ring within the nut and having a tongue extending into said groove and a toothed portion adapted for engagement with said surface, a tongue extended endwise from the ring in an external direction and in the plane thereof, and tension means to induce the ring to effect the engagement referred to, said tongue serving as a handle to effect the disengagement of the ring.

2. The combination with a longitudinally grooved bolt shank; of a nut lock comprising a nut externally grooved and with an interrupted annular surface internally, a spring pressed ring within the nut and having a tongue extending into said groove and a toothed portion adapted for engagement with said surface, a tongue extended endwise from the ring in an external direction and adapted to be forced inwardly to disengage the toothed portions of the ring and nut, and an external retainer ring over the cover plate and clinched into the external groove of the nut, and tension means to induce the ring to effect the engagement referred to.

3. The combination with a longitudinally-grooved bolt shank; of a nut lock comprising a nut with an interrupted annular surface, a ring within the nut and having a toothed portion adapted for engagement with said surface whereby to prevent relative rotation between the nut and the bolt, said ring also having an external transverse recess, means cooperating with the bolt shank groove to lock the ring against rotation relative to the bolt, and a leaf spring lodged between the ring and the nut, said spring urging the ring into said engagement and having a transverse extension seating in the recess.

4. The combination with a longitudinally-grooved bolt shank; of a nut lock comprising a nut with an interrupted annular surface, a ring within the nut and having a toothed portion adapted for engagement with said surface whereby to prevent relative rotation between the nut and the bolt, said ring also having an external transverse recess, means cooperating with the bolt shank groove to lock the ring against rotation relative to the bolt, and a leaf spring lodged between the ring and the nut, said spring urging the ring into said engagement and having lateral branches seating in the recess.

5. The combination with a longitudinally-grooved bolt shank; of a nut lock comprising a nut with an interrupted annular surface, a ring within the nut and having a toothed portion adapted for engagement with said surface whereby to prevent relative rotation between the nut and the bolt, said ring also having a perforation and inner and outer recesses terminally of the latter means cooperating with the bolt shank groove to lock the ring against rotation relative to the bolt, and a leaf spring lodged between the ring and the nut and urging the ring into said engagement, said spring linking with the ring by way of the perforation and seating on alternate sides of the ring in said recesses.

6. The combination with a longitudinally-grooved bolt shank; of a nut lock comprising a nut with an interrupted annular surface, a ring within the nut and having a toothed portion adapted for engagement with said surface whereby to prevent relative rotation between the nut and the bolt, said ring ring also having a circumferential slot, means coperating with the bolt shank groove to lock the ring against rotation relative to the bolt, and a leaf spring lodged between the ring and the nut and urging the ring into said engagement, said spring linking with one end portion in one end of the slot, and adapted to be received in the latter when the ring is backed out of the engagement mentioned.

In testimony whereof I affix my signature.

GEORGE ROSSETTI.